F. J. JOHANSSON & E. A. O. GOTHE.
MILKING MACHINE OPERATED BY COMPRESSED AIR OR THE LIKE.
APPLICATION FILED OCT. 21, 1913.
1,116,708. Patented Nov. 10, 1914.
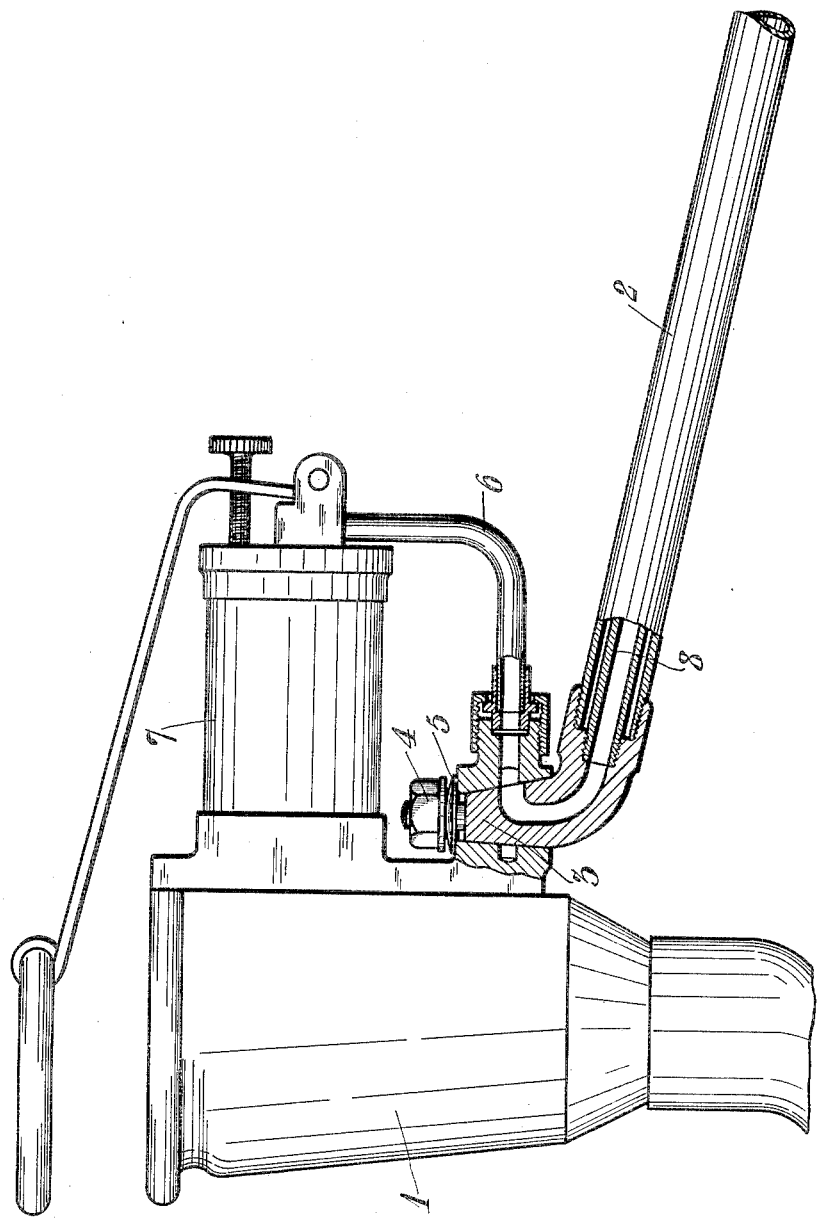
Witnesses:
K. E. Wiberg
N. Perry
Inventors:
Frans J. Johansson
Emil A. O. Gothe

UNITED STATES PATENT OFFICE.

FRANS J. JOHANSSON, OF STOCKHOLM, AND EMIL A. O. GÖTHE, OF NYNÄSHAMN, SWEDEN.

MILKING-MACHINE OPERATED BY COMPRESSED AIR OR THE LIKE.

1,116,708.     Specification of Letters Patent.     Patented Nov. 10, 1914.

Application filed October 21, 1913. Serial No. 796,401.

*To all whom it may concern:*

Be it known that we, FRANS JOSEF JOHANSSON and EMIL ALBERT OLSSON GÖTHE, subjects of the King of Sweden, and residents of Stockholm, Sweden, and Nynäshamn, Sweden, respectively, have invented new and useful Improvements in Milking-Machines Operated by Compressed Air or the like, of which the following is a specification, reference being had to the drawing accompanying and forming a part hereof.

This invention relates to milking machines and more especially to devices of this kind adapted to be operated by compressed air or any other suitable pressure-medium that operates a mechanical device with which each teat is provided.

It is important, in machines commonly called mechanical milking machines that each teat-element or machine be easily adjusted to any udder. For this purpose the teat-elements usually are connected with bar-shaped arms or branches, said arms being adapted to swing, to be moved lengthwise and to be turned; the teat-elements being also movably joined to the arms. This motion necessitates each teat-element to be provided with a separate air-pressure conduit that is flexible in all directions.

The object of the invention is to simplify the machine, so that the aforesaid individual superfluous air-conduits may be dispensed with. Said object is accomplished by making the arms supporting the teat-elements in the shape of an air-conduit, *i. e.* making the arms supporting the teat-elements serve both as supports and as pressure conduits.

The accompanying drawing shows one possible form of construction of the invention.

The teat-element 1 is supported by the arm 2, comprising a tube utilized as a pressure conduit. Said arm 2 is firmly secured to or eventually made in one piece with the turning element 3 of a plug-cock the body of which forms a rigid part of the teat-element, the turning element being held in place by means of nut 4 and spring washer 5. Connected to the rigid part of the plug-cock is the pressure conduit 6 leading into a cylinder 7 in which is a movable piston of the usual type, acting upon the pressure-device provided in the teat-element. The extension of the pressure conduit 6 into the rigid part of the plug-cock, forms a circular recess within the same, so as to always communicate with the pressure conduit 2, whatever position the teat-element may take in relation to the conduit.

To obtain the required strength of the arm forming the pressure conduit it is necessary to have the tube of a substantial heavy dimension. To lead the air back and forth in such a heavy pipe is, however, disadvantageous partly because it is an unreasonably big quantity of air that has to be used and partly because such large air-quantity through its greater compressibility does not transmit the pressure as rapidly as a smaller quantity of air. To prevent such disadvantages a pipe 8 of a smaller diameter is placed inside the larger pipe 2, and serves as the proper air conduit.

Having now described our invention, what we claim as new and desire to secure by Letters Patent is:

1. In a milking-machine operated by air pressure or other pressure medium, a teat-element supported by an adjustable arm, a conduit for the pressure medium being provided in said arm.

2. In a milking-machine operated by air pressure or other pressure medium, a teat-element supported by an adjustable arm consisting of a tube connected to the turning element of a plug-cock, the body of said plug-cock being attached to and communicating with the teat-element, substantially as and for the purpose set forth.

3. In a milking-machine operated by air pressure or other pressure medium, a teat-element supported by an adjustable arm, said arm consisting of two tubes of different diameter one inside the other, the smaller one serving as air conduit, the larger as support, substantially as and for the purpose set forth.

FRANS J. JOHANSSON.
EMIL A. O. GÖTHE.

Witnesses:
K. E. WIBERG,
N. PERRY.